United States Patent
Holopainen et al.

(10) Patent No.: US 11,817,743 B2
(45) Date of Patent: Nov. 14, 2023

(54) ELECTRIC MACHINE

(71) Applicant: ABB Schweiz AG, Baden (CH)

(72) Inventors: Timo Holopainen, Helsinki (FI); Juha Pekka Jokinen, Helsinki (FI); Carlos Chavez, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 393 days.

(21) Appl. No.: 17/241,491

(22) Filed: Apr. 27, 2021

(65) Prior Publication Data

US 2021/0351640 A1    Nov. 11, 2021

(30) Foreign Application Priority Data

May 6, 2020  (EP) .................... 20173122

(51) Int. Cl.
*H02K 1/18* (2006.01)
*H02K 5/24* (2006.01)

(52) U.S. Cl.
CPC .............. *H02K 1/185* (2013.01); *H02K 5/24* (2013.01); *H02K 2213/03* (2013.01)

(58) Field of Classification Search
CPC ............ H02K 1/18; H02K 1/185; H02K 5/24; H02K 2213/03
See application file for complete search history.

(56) References Cited

U.S. PATENT DOCUMENTS

| | | | |
|---|---|---|---|
| 5,783,892 A * | 7/1998 | Kanzaki ............. | H02K 5/04 310/58 |
| 2008/0157624 A1* | 7/2008 | Holopainen ........ | H02K 5/225 310/428 |
| 2017/0040864 A1 | 2/2017 | Takabe | |

FOREIGN PATENT DOCUMENTS

| | | | |
|---|---|---|---|
| EP | 2383866 | A2 | 11/2011 |
| EP | 3487046 | A1 | 5/2019 |
| JP | 2009095184 | A * | 4/2009 |
| JP | 2016059173 | A | 4/2016 |
| WO | 2006087418 | A1 | 8/2006 |
| WO | 2019137610 | A1 | 7/2019 |

OTHER PUBLICATIONS

Kato, Machine Translation of JP2009095184, Apr. 2009 (Year: 2009).*
Uchibori, Machine Translation of JP2016059173, Apr. 2016 (Year: 2016).*
European Search Report; Application No. EP 20 17 3122; dated Oct. 14, 2020; 2 Pages.

* cited by examiner

*Primary Examiner* — Eric Johnson
(74) *Attorney, Agent, or Firm* — WHITMYER IP GROUP LLC

(57) ABSTRACT

An electric machine including a stator and a frame, the stator is supported with support necks on the frame in at least two axially spaced support locations. The support locations include a first group of support necks and a second group of support necks. The support necks in the first group are positioned in connection with a vertical centre plane. The second group includes two side support necks positioned opposite to each other at an angular distance above or below a horizontal centre plane. The angular distance is defined by a first angle which is determined in degrees by the formula $\alpha 1=(90/P)\pm(\frac{1}{5})*(90/P)$, where P is the number of poles of the electric machine and P>2.

19 Claims, 5 Drawing Sheets

ELECTRIC MACHINE

TECHNICAL FIELD

The invention relates to an electric machine comprising a cylindrical stator and a frame surrounding the stator.

BACKGROUND

An electric machine may convert electric energy to mechanical energy or vice versa. This conversion may be carried out by the magnetic field in the air gap of the electric machine. The fundamental component of this magnetic field may produce a rotating traction field on the inner surface of the stator core. This traction field may yield a rotating deformation field of the stator yoke. This deformation field may be prismatic in relation to the axis of the shaft. The number of deformation waves around the stator circumference may be the same as the number of motor poles. This rotating deformation wave is the origin of the well-known twice-supply-frequency (2F) vibration of electrical machines.

In medium to large sized electric machines the primary cooling of the electric machine may be arranged by air circulation. The stator may often be separated from the frame and the stator may be supported on the frame by intermediate walls or other support arrangements. The stator deformation may be transmitted to the frame via the support arrangement between the stator and the frame. The stator deformations, i.e. excitations, may occur in the radial direction, but the vibrations are transmitted all over the frame and the surroundings as noise. These 2F electrical excitations may excite the axial modes of the bearing shields including the end structures of the frame and the bearings. The damping of these vibration modes is low, which means that the vibration amplitudes are high, when the shield vibration modes are in resonance. The most common solution to this problem has been to avoid driving the electric machine at rotational speeds corresponding to the resonance speeds. The avoidance of these resonance speeds may, however, be difficult e.g. in connection with variable speed drive (VSD) electric motors.

There are in principle three alternatives to deal with the problem. A first alternative is to reduce the excitation forces, a second alternative is to increase damping of the bearing shield vibration modes, and a third alternative is to prevent the excitations from being transmitted to the frame end shields of the electric machine. The reduction of exciting forces can be realized by increasing the thickness of the stator yoke, by additional cylindrical stiffeners of the stator yoke, or by decreasing the magnetic flux density of the machine. The reduction of exciting forces by these solutions is rather expensive and/or decreases the electrical performance of the electric machine. Passive dampers would form additional components in the electric machine and they must be tuned for a certain resonance.

There is thus a need for a solution based on the third alternative i.e. to prevent the excitations from being transmitted to the frame end shields of the electric machine.

WO 2006/087418 discloses an electrical machine with a stator formed of plates. The stator has an outer surface and a first and second end in the axial direction. The stator is supported on a frame of the electrical machine. The stator is supported by necks of material on the outer surface at both ends of the stator. The number of necks at both ends of the stator is even. The stator has a vertical symmetry axis perpendicular to the axial direction and a horizontal symmetry axis perpendicular to the axial direction. The necks are located symmetrically in relation to at least one of the symmetry axes.

WO 2019/137610 discloses an electric machine. The electric machine comprises a stator core with a longitudinal center axis and a frame surrounding the stator core. The stator core is attached to the frame through four fastening points, whereby two fastening points are positioned at a first axial end of the stator core on opposite sides of the longitudinal center axis and two fastening points are positioned at a second opposite axial end of the stator core on opposite sides of the longitudinal center axis.

JP 2016/059173 discloses a dynamo-electric machine. Each phase coil of a concentrated winding is wound around the stator. The number of poles in the machine and the number of fastening protrusions in the stator for attaching the stator to the frame is equal i.e. five. The fastening protrusions are arranged at equal angular distances along the circumference of the stator. The angular distance between two adjacent fastening protrusions is thus 72 degrees. Only three of the five protrusions are used for the actual attaching of the stator to the frame. The two remaining fastening protrusions are dummy fastening protrusions i.e. they are not used for the actual attaching of the stator to the frame.

SUMMARY

An object of the present invention is to achieve an improved support arrangement between the stator and the frame in the electric machine in order to prevent or at least reduce the transmittance of excitations from the stator to the frame end shields.

The electric machine is defined in claim 1.

The electric machine comprises a cylindrical stator and a frame surrounding the stator, the stator comprising an axial centre line, a vertical centre plane passing through the axial centre line and dividing the stator into a left half and a right half, and a horizontal centre plane passing through the axial centre line and dividing the stator into an upper half and a lower half, the stator being supported on the frame with support necks in at least two axially spaced support locations, a first support location being positioned at a first end portion of the stator and a second support location being positioned at a second end portion of the stator, the support necks in the first support location and in the second support location comprising a first group of support necks and a second group of support necks, the first group of the support necks comprising at least one upper support neck positioned in the upper half of the stator in a first sector extending 35 degrees on opposite sides of the vertical centre plane and at least one lower support neck positioned in the lower half of the stator in a second sector extending 35 degrees on opposite sides of the vertical centre plane.

The electric machine is characterized in that the second group of support necks comprises a first side support neck and a second side support neck being positioned opposite to each other in relation to the vertical centre plane, the first side support neck being positioned in the left half of the stator at a first angular distance above or below the horizontal centre plane, the second side support neck being positioned in the right half of the stator at a second angular distance above or below the horizontal centre plane, the first angular distance and the second angular distance being equal and defined by a first angle $\alpha 1$, which is in degrees within the range $\alpha 1=1.2*90/P$ and $\alpha 1=0.8*90/P$, where P is the number of poles of the electric machine and $P>2$.

The electric machines are normally substantially symmetric with respect to the vertical center plane including the axis of the shaft. The lowest natural vibration mode of the end shield, i.e. the umbrella mode, is thus symmetric with respect to the vertical center plane. In addition, because the rotating deformation field is in the same phase on both sides of the stator on the horizontal plane including the axis of the shaft, all the symmetrical modes with respect to the vertical centre plane are excited effectively. Thus, by changing the support necks of the stator so that the stator deformation in these support necks is out-of-phase, the excitation of symmetric vibration modes is cancelled.

In prior art stator suspensions where the first group of support necks comprises an upper support neck and a lower support neck positioned on the vertical centre plane and the second group of support necks comprises two side support necks positioned opposite to each other on the horizontal centre plane, the forced motion of the two side support necks of the electric machine are equal. This means that the electrical 2F excitation can effectively excite the axial shield modes. However, if the locations of the two side support necks are spatially shifted so that the radial motion of the two side support necks is out of phase, then the excitation of symmetric shield vibration modes is neutralized.

The support arrangement according to the invention between the stator and the frame was tested with a 4-pole electric machine. The stator was first supported on the frame with a prior art support arrangement. The stator was supported on the frame at two axial support locations at the axial end portions of the stator with four support necks at each support location. The first group of support necks contained an upper support neck and a lower support neck positioned on the vertical centre plane of the stator. The second group of support necks contained two opposite side support necks positioned on the horizontal centre plane of the stator. The prior art support arrangement between the stator and the frame resulted in an axial vibration of 8.5 mm/s at 172 Hz occurring at a rotational speed of 2580 r/min.

The stator of the electric machine was then supported on the frame with a support arrangement according to the invention. The stator was supported on the frame at the same two axial support locations at the axial end portions of the stator with four support necks at each support location. The first group of support necks contained an upper support neck and a lower support neck positioned on the vertical centre plane of the stator. The second group of support necks contained two opposite side support necks positioned at an angular distance above the horizontal centre plane. The first angle $\alpha 1$ defining the angular distance of the two side support necks above the horizontal centre plane was $\alpha 1=90/4=22.5$ degrees in the four-pole electric machine. The support arrangement according to the invention between the stator and the frame reduces the resonance peak from 8.5 mm/s to 1.25 mm/s. The reduction of the amplitude of the axial vibration is thus 85% and this is achieved without any adversary affects.

The support arrangement according to the invention between the stator and the frame may in principle be used in any kind of electric machines, e.g. in multipole electric machines. The pole number of the electric machine should be greater than two.

The support arrangement according to the invention have been tested to work well especially in an electric machine with four poles.

The invention is especially suitable to be used in medium to large sized electric machines. The shaft height of the electric machine may be $\geq 400$ mm, the nominal voltage of the electric machine may be $\geq 1$ kV, and the nominal power of the electric machine may be $\geq 1$ MW.

BRIEF DESCRIPTION OF THE DRAWINGS

In the following the invention will be described in greater detail by means of preferred embodiments with reference to the attached drawings, in which.

DETAILED DESCRIPTION

Figure 1:
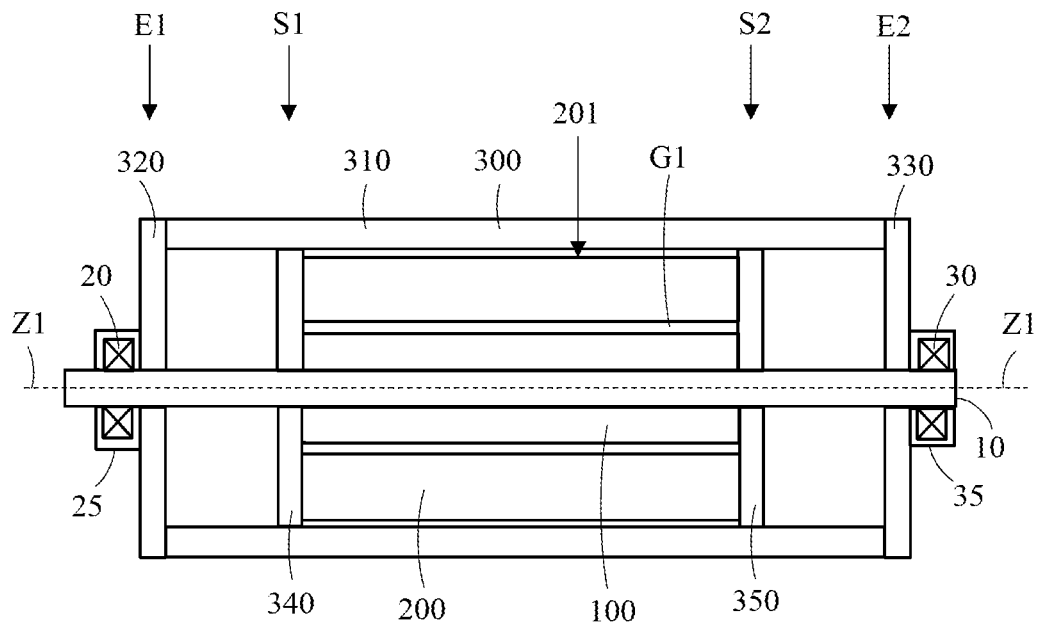
FIG. 1 shows a longitudinal cross-section of an electric machine.
Figure 2:
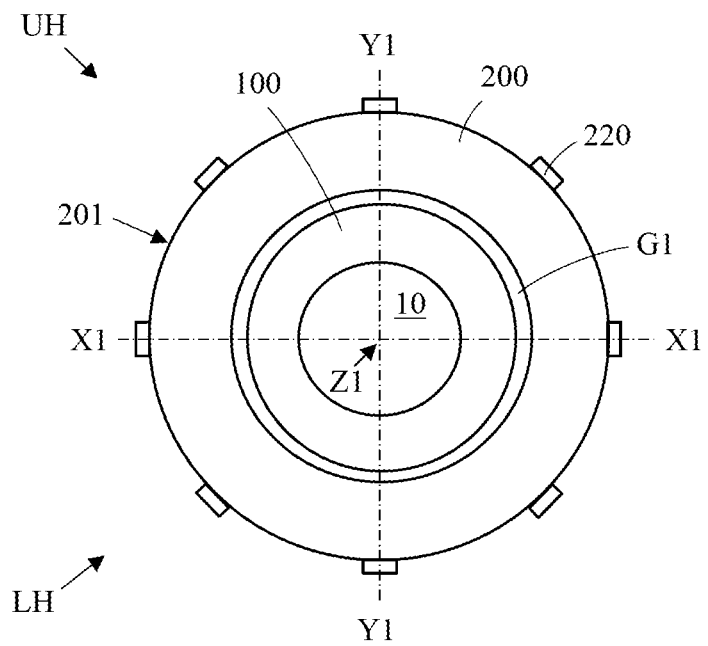
FIG. 2 shows a transverse cross-sectional view of the active parts of the electric machine.

FIG. 1 shows a longitudinal cross-section of an electric machine and FIG. 2 shows a transverse cross-sectional view of the active parts of the electric machine.

The electric machine comprises a shaft 10, a rotor 100, a stator 200 surrounding the rotor 100, and a frame 300 surrounding the stator 200. The frame 300 is not shown in the cross section of the electric machine.

There is an air gap G1 between the outer surface of the rotor 100 and the inner surface of the stator 200.

The rotor 100 surrounds an axial middle portion of the shaft 10. The rotor 100 is attached to the shaft 10 and rotates with the shaft 10. The shaft 10 may be supported on the frame 300 through bearings 20, 30 positioned in a bearing housing 25, 35.

The stator 200 may have a substantially cylindrical shape provided with an inner bore receiving the rotor 100 and an outer surface 201. The rotor 100 may also have a substantially cylindrical shape.

The stator 200 may comprise an axial centre line Z1-Z1. The stator 200 may further comprise a vertical centre plane Y1-Y1 and a horizontal centre plane X1-X1. The vertical centre plane Y1-Y1 and the horizontal centre plane X1-X1 may pass through the axial centre line Z1-Z1 of the stator 200. The horizontal centre plane X1-X1 divides the stator 200 into on upper half UH and a lower half LH.

The axial centre line Z1-Z1 of the stator 200 may form a rotational axis of the shaft 10 and of the rotor 100 of the electric machine.

The stator 200 may have a laminated structure i.e. it may be composed of annular sheets that are stacked together to form the stator 200.

The frame 300 may comprise a longitudinal frame structure 310 extending in the axial direction of the electric machine and two opposite frame end shields 320, 330. Each frame end shield 320, 330 may be attached to a respective axial end E1, E2 of the frame 300. The frame 300 may further comprise at least two axially Z1-Z1 spaced intermediate frame plates 340, 350. The intermediate frame plates 340, 350 may be positioned at axial Z1-Z1 support locations S1, S2. A first intermediate frame plate 340 may be positioned at a first axial Z1-Z1 support location S1 at a first axial end portion of the stator 200. A second frame plate 350 may be positioned at a second axial Z1-Z1 support location S2 at a second opposite axial Z1-Z1 end portion of the stator 200. The first intermediate frame plate 340 and the second intermediate frame plate 350 may form the axially Z1-Z1 outermost support locations S1, S2 between the stator 200 and the frame 300. The first support location S1 and the second support location S2 may thus be positioned at a respective axial Z1-Z1 end of the stator 200 or near the axial Z1-Z1 end of the stator 200. At least one further intermediate support plate may be positioned between the first intermediate frame plate 340 and the second intermediate frame plate 350. The amount of possible further intermediate frame plates between the first intermediate frame plate 350 and the second intermediate frame plate 350 depends on the length of the stator 200 of the electric machine. A transverse cross-section of the longitudinal frame structure 310 may have a substantially rectangular shape with a circular opening in the middle.

Each bearing housing 25, 35 may be supported on a respective end shield 320, 330.

The outer surface 201 of the stator 200 may be provided with back beams 220. The back beams 220 may extend axially along the outer surface of the stator 200 between the axial ends of the stator 200. The back beams 220 may be evenly or non-evenly distributed along the circumference of the stator 200. The figure shows eight back beams 220, but there could be any number of back beams 220 on the outer surface of the stator 200. The back beams 220 may be attached e.g. with welding or with a dovetail joint to the outer surface 201 of the stator 200.

The first axial Z1-Z1 end E1 of the frame 300 may be at the drive end of the electric machine and the second axial Z1-Z1 end E2 of the frame 300 may be at the non-drive end of the electric machine.

The rotor windings and the stator windings are not shown in the figure. There may be one or more windings in the rotor and/or in the stator.

Figure 3:
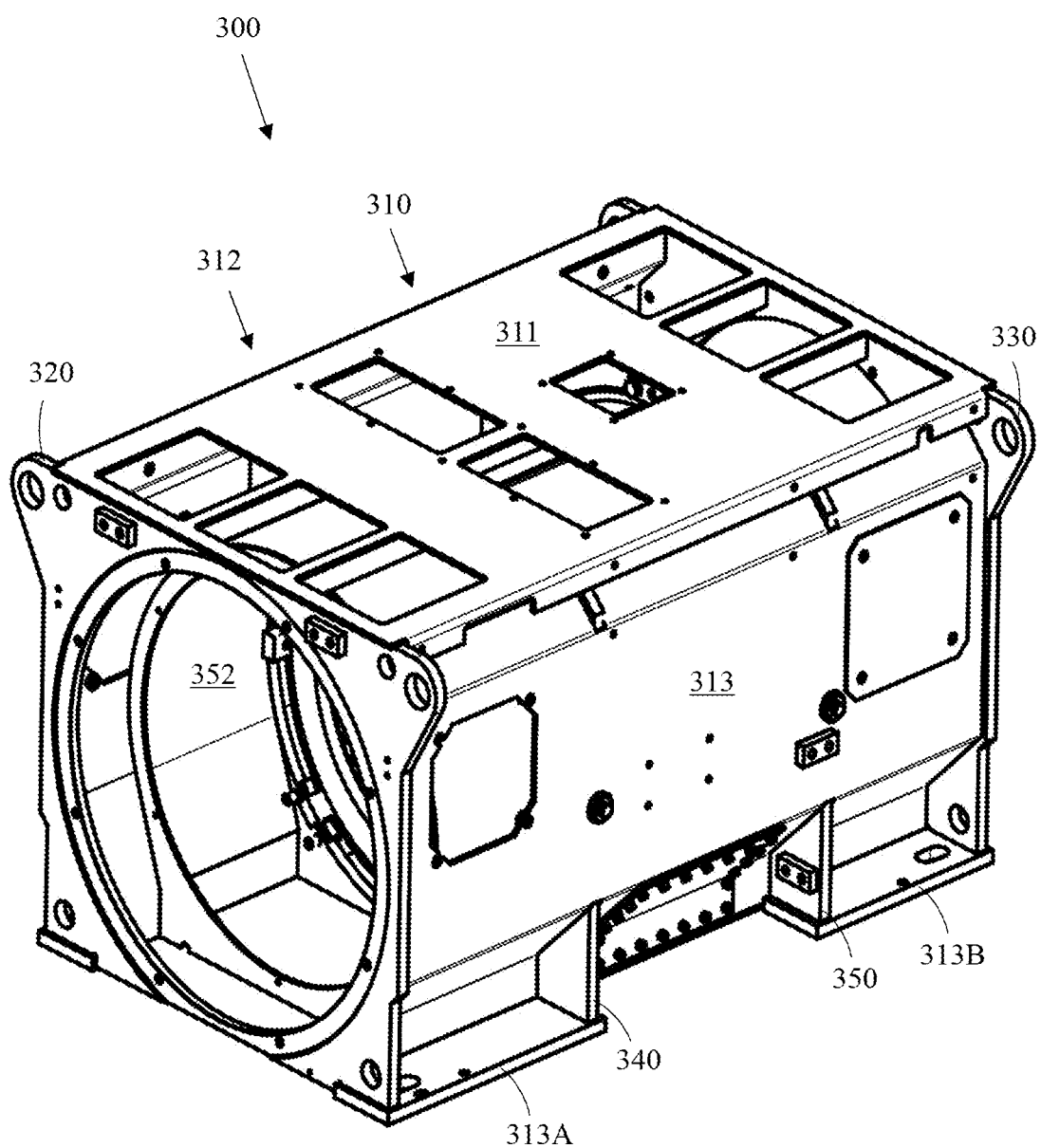
FIG. 3 shows an axonometric view of a frame of the electric machine.

FIG. 3 shows an axonometric view of a frame of the electric machine.

The frame 300 may comprise a longitudinal frame structure 310 having two opposite axial ends and two opposite frame end shields 320, 330. Each frame end shield 320, 330 may be attached to a respective axial end of the longitudinal frame structure 310. The two opposite frame end shields 320, 330 are thus positioned at an axial Z1-Z1 distance from each other. Each frame end shield 320, 330 may comprise a circular opening through which the stator 200 and the rotor 100 may be pushed into the frame 300. The frame 300 may further comprise at least two intermediate frame plates 340, 350. A first intermediate frame plate 340 may be positioned at a first axial end portion of the stator 200 and a second intermediate frame plate 350 may be positioned at a second opposite end portion of the stator 200. There could be at least one further intermediate frame plate between the first intermediate frame plate 340 and the second intermediate frame plate 350. The possible need for further intermediate frame plates between the first intermediate frame plate 340 and the second intermediate frame plate 350 depends on the axial Z1-Z1 length of the stator 200 i.e. the size of the electric machine. The intermediate frame plates 340, 350 may also comprise a circular opening through which the stator 200 and the rotor 100 may be pushed into the frame 300. The longitudinal frame structure 310 extending axially Z1-Z1 between the frame end shields 320, 330 may comprise an upper plate 311 and two opposite side plates 312, 313. The side plates 312, 313 may comprises foot portions 313A, 3136 through which the frame 300 may be attached to a base. The upper plate 311 and the side plates 312, 313 may further comprise hatches allowing access to the interior of the frame 300. There may be further intermediate frame plates in the longitudinal frame structure 310 between the frame end shields 320, 330. The intermediate frame plates 340, 350 may surround the stator 200. The edge of the circular opening in the frame end shields 320, 330 and in the intermediate frame plates 340, 350 for receiving the stator 200 may form an inner surface of the frame end shields 320, 330 and the intermediate frame plates 340, 350.

A transverse cross-section of the frame 300 may be substantially rectangular. A circular opening is provided in the middle of the frame 300 at the frame end shields 320, 330 and at the intermediate frame plates 340, 350.

The stator 200 may be supported on the frame 300 through support necks P1, P2, P3, P4 provided between the stator 200 and the intermediate frame plates 340, 350.

The frame 300 may be substantially symmetrical in relation to the vertical centre plane Y1-Y1. The two halves of the frame 300 on opposite sides of the vertical centre plane Y1-Y1 may be mirror images of each other.

Figure 4:
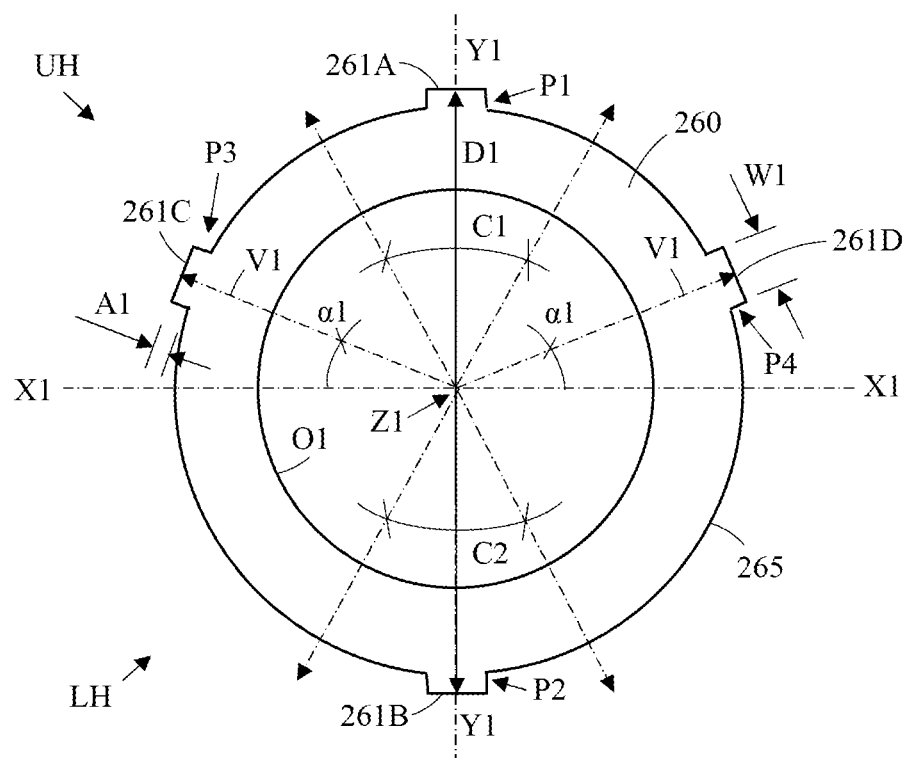
FIG. 4 shows a stator end plate of the electric machine.

FIG. 4 shows a stator end plate of the electric machine.

The stator 200 may comprise a stator end plate 260 at each axial Z1-Z1 end of the stator 200. The pack of stator plates with the end plates 260 may be pressed together in the axial Z1-Z1 direction in a press. The back beams 220 may then be attached e.g. by welding to the outer surface 201 of the stator pack in order to keep the stator pack together. Attachment of the back beams 220 through welding to the outer surface 201 of the stator 200 will keep the stator pack together without any further fastening means. The back beams 220 may on the other hand be attached to the outer surface 201 of the stator 200 through a dovetail joint. In case a dovetail joint is used, then some other measures are needed in order to keep the stator pack together. The stator pack could then be hold together with axial Z1-Z1 bolts passing through the stator pack.

The stator end plates 260 may form support plates of the stator 200. The stator 200 may be supported on the frame 300 with support necks P1, P2, P3, P4 extending between the stator end plate 260 and the corresponding intermediate frame plate 340, 350. The stator end plate 260 may be formed as a cylindrical ring having an inner opening O1 and an outer surface 265. The outer surface 265 of the stator end plate 265 may be provided with protrusions 261A, 261B, 261C, 261D extending radially outwards from the outer surface 265 of the stator end plate 260. The protrusions 261A, 261B, 261C, 261D may be distributed on the outer surface 265 of the stator end plate 260. The inner opening O1 of the stator end plate 260 may be circular. The diameter of the inner opening O1 may correspond to the bore of the stator 200 receiving the rotor 100. The stator end plate 260 including the protrusions 261A, 261B, 261C, 261D may have an outer diameter D1. The radially outer surface of the protrusions 261A, 261B, 261C, 261D may be curved. The protrusions 261A, 261B, 261C, 261D may form support necks P1, P2, P3, P4.

The vertical centre plane Y1-Y1 and the horizontal centre plane X1-X1 of the stator 200 are also shown in the figure. The vertical centre plane Y1-Y1 and the horizontal centre plane X1-X1 of the stator 200 pass through the axial centre line Z1-Z1 of the stator 200. The axial centre line Z1-Z1 of the stator 200 forms also the axial centre line of the stator end plate 260. The upper half UH and the lower half LH of the stator 200 are also denoted in the figure.

The protrusions 261A, 261B, 261C, 261D may be formed of a first group of protrusions 261A, 261B i.e. a first group of support necks and a second group of protrusions 261C, 261D i.e. a second group of support necks. The first group of protrusions 261A, 261B may comprise two protrusions 261A, 261B and the second group of protrusions 261C, 261D may comprise two protrusions 261C, 261D. The two protrusions 261A, 261B in the first group of protrusions may be positioned opposite to each other substantially on the vertical centre plane Y1-Y1 of the stator 200. The two protrusions 261C, 261D in the second group of protrusions may be positioned opposite to each other at an angular distance above the horizontal centre plane X1-X1. The angular distance may be defined by a first angle $\alpha 1$ which is determined in degrees by the formula $\alpha 1=(90/P)\pm(1/5)*(90/P)$, where P is the number of poles of the electric machine and P>2.

The first angle $\alpha 1$ extends between the horizontal centre plane X1-X1 and a first vector V1 extending from the centre axis Z1-Z1 to an angular middle point of the respective protrusions 261C, 261D in the second group of protrusions.

The figure shows also a first sector C1 in the upper half UH of the stator 200 extending at opposite sides of the vertical centre plane Y1-Y1 and a second sector C2 in the lower half LH of the stator 200 extending at opposite sides of the vertical centre plane Y1-Y1. The first sector C1 extends 35 degrees on opposite sides of the vertical centre plane Y1-Y1. The total angular length of the first sector C1 is thus 70 degrees. The second sector C2 extends also 35 degrees on opposite sides of the vertical centre plane Y1-Y1. The total angular length of the second sector C2 is thus 70 degrees. The first support neck P1 in the first group of support necks may be positioned in any position within the first sector C1. The second support neck P2 in the first group of support necks may also be positioned in any position within the second sector C2.

The angular length of the two support necks P1, P2 in the first group of support necks is rather small in the figure. This is an advantageous embodiment. The angular length of the two support necks P1, P2 in the first group of support necks could, however, also be much bigger. The first support neck P1 and/or the second support neck P2 could extend in the angular direction along the hole angular length of the respective sector C1, C2.

The first group of support necks P1, P2 comprises only two support necks P1, P2 in the figure. The first group of support necks P1, P2 could, however, comprise more than two support necks. The first group of support necks P1, P2 could comprise an even number of support necks. The support necks P1, P2 in the first group of support necks could be evenly divided between the first sector C1 and the second sector C2. The first group of support necks could comprise 2, 4, 6, 8 etc. support necks. Each of the first sector C1 and the second sector C2 could thus comprise 1, 2, 3, 4 etc. support necks. The support necks in the first sector C1 and the support necks in the second sector C2 could form pairs, whereby the two support necks in each pair of support necks could be positioned vertically opposite to each other in the respective sectors C1, C2.

The depth A1 of the protrusion 261A, 261B, 261C, 261D i.e. the support necks P1, P2, P3, P4 in a radial direction may be very small compared to the outer diameter of the stator. The width W1 of the protrusion 261A, 261B, 261C, 261D i.e. the support necks P1, P2, P3, P4 in the circumferential direction may also be small compared to the outer diameter of the stator. This is especially the case for the protrusions 261C, 261D i.e. the support necks P3, P4 in the second group of protrusions.

Figure 5:
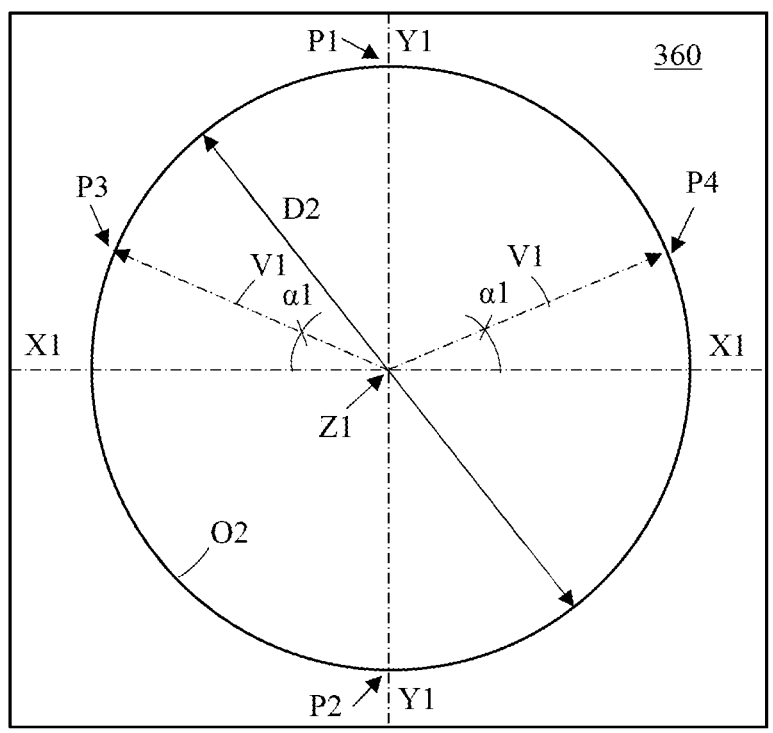
FIG. 5 shows an intermediate frame plate of the electric machine.

FIG. 5 shows an intermediate frame plate of the electric machine.

The intermediate frame plates 340, 350 of the frame 300 of the electric machine may be identical. The frame plate 360 shown in the figure may be used as an intermediate frame plate 340, 350 at each axial end of the stator 200. The intermediate frame plate 360 may have a substantially rectangular outer perimeter with an opening O2 in the centre of the intermediate frame plate 360. The opening O2 in the centre of the intermediate frame plate 360 may receive the stator end plate 260. The opening O2 in the centre of the intermediate frame plate 360 may be circular. The opening O2 in the centre of the intermediate frame plate 360 may have an inner diameter D2. The outer diameter D1 of the stator end plate 260 is approximately the same as the inner diameter D2 of the opening O2 in the centre of the intermediate frame plate 360. The stator end plate 260 with the protrusions 261A, 261B, 261C, 261D will thus fit into the opening O2 in the intermediate frame plate 360.

The stator end plate 260 may be attached to the intermediate frame plate 360 via the protrusions 261A, 261B, 261C, 261D in the stator end plate 260. The protrusions 261A, 261B, 261C, 261D form support necks P1, P2, P3, P4 between the stator 200 and the frame 300 i.e. between the stator end plate 260 and the intermediate frame plate 260. Fastening means e.g. in the form of splines may further extend between the intermediate frame plate 360 and the protrusions 261A, 261B, 261C, 261D in the stator end plate 260. The fastening means may lock the stator 200 in the axial and in the circumferential direction to the frame 300. The stator end plate 260 may thus be supported through these protrusions 261A, 261B, 261C, 261D on the intermediate frame plate 360 and thereby on the frame 300.

The vertical centre plane Y1-Y1 and the horizontal centre plane X1-X1 of the stator 200 are also shown in the figure. The vertical centre plane Y1-Y1 and the horizontal centre plane X1-X1 of the stator 200 pass through the axial centre line Z1-Z1 of the stator 200. The axial centre line Z1-Z1 of the stator 200 forms also the axial centre line of the intermediate frame plate 360.

The first angle $\alpha 1$ extends between the horizontal centre plane X1-X1 and a first vector V1 extending from the centre line Z1-Z1 to the respective support neck P3, P4 in the second group of support necks.

A shrink fit may be used to attach the protrusions 261A, 261B, 261C, 261D in the stator end plate 260 to the opening O2 in the intermediate frame plate 360. Shrink-fitting is a technique in which an interface fit between two components is achieved by a relative size change of the components after assembly. This may be achieved by heating or cooling one of the components before assembly and allowing the heated or cooled component to return to the ambient temperature after assembly, whereby a thermal expansion makes the joint between the two components.

The stator end plate 260 is in the embodiment shown in FIG. 4 provided with protrusions 261A, 261B, 261C, 261D. The situation could, however, be reversed so that the intermediate frame plate 360 would be provided with protrusions extending radially inwards towards the stator end plate 260. The outer surface of the stator end plate 260 would be circular without protrusions. The protrusions in the intermediate frame plate 360 would then seat on the outer surface of the stator end plate 260.

The first intermediate frame plate 340 may be positioned at a distance from the first axial Z1-Z1 end of the stator 200 and the second intermediate frame plate 350 may be positioned at a distance from the second opposite axial Z1-Z1 end of the stator 200. The stator 200 may in such a situation be attached to the frame 300 from the back beams 220 instead of from the stator end plates 360. The axial back beams 220 may be positioned on the circumference of the stator 200 so that the desired positions of the support necks P1, P2, P3, P4 may be achieved. A C-clamp may be attached to the back beam 220 by welding and the C-clamp may be attached with bolts to the frame plate 340, 350. There may be a shrink fit between the back beams 220 and the opening O2 in the intermediate frame plate 340, 350. Only some of the back beams 220 running on the outer surface of the stator 200 may be used in the attachment. A small radial spacing may be arranged between the edge of the opening O2 in the intermediate frame plate 340, 350 and the radially outer surface of the back beam 220 at those back beams 220 which are not used for the attachment between stator 200 and the frame 300. The support between the stator 200 and the frame 300 may thus be only through those back beams 220 which are used for the attachment between the stator 200 and the frame 300.

Figure 6:
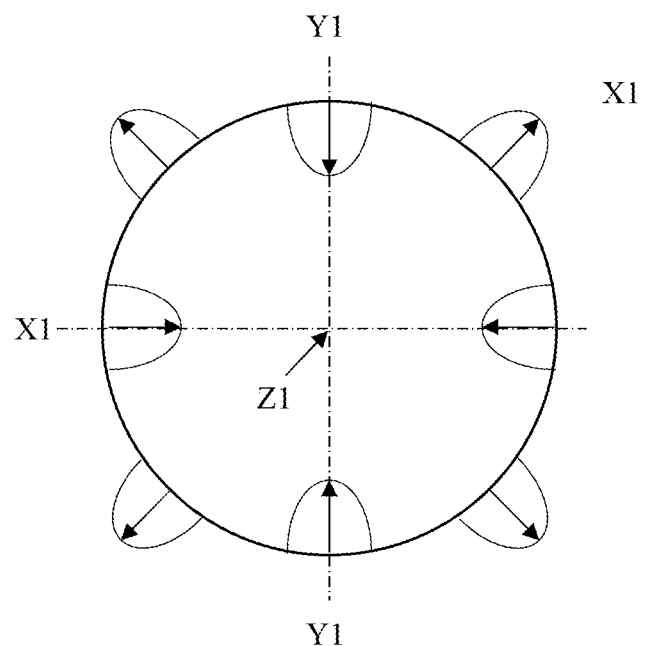
FIG. 6 shows schematically rotating stator tooth forces in an electric machine.

FIG. 6 shows schematically rotating stator tooth forces in an electric machine.

The figure shows the rotating stator tooth forces in an electric machine with four poles. The electrical 2F force is a rotating traction distribution on the inner surface of the stator. In this rotating traction distribution, there are four maxima and minima in 360 degrees.

The axial excitations are transmitted from the stator to the frame via the sides, the bottom and the top of the electric machine. This transmission is contributed by the beams on the sides and on the top of the electric machine. The electric machine is substantially symmetric in relation to the vertical centre plane Y1-Y1. In addition, the critical frame end shield modes, i.e. the umbrella modes, are symmetric with respect to the same plane. With the prior art four-point stator suspension, the forced motion of the two side support necks P3, P4 are equal. This means that the electrical 2F excitation can effectively excite the axial shield modes. However, if the locations of the two side support necks P3, P4 are spatially shifted so that the radial motion of the two side support necks P3, P4 is out of phase, then the excitations of symmetric shield modes are neutralized. In principle, something similar could be done for the upper support neck P1 and the lower support neck P2. However, this is more difficult because the electric machine is normally asymmetric in relation to the horizontal centre plane X1-X1. The shifting of the two side support necks P3, P4 seems to be so effective that there is no need to consider changing the upper support neck P1 and the lower support neck P2.

The example is based on a symmetrically cooled four-pole electric machine, but the results are applicable for all symmetrically or asymmetrically cooled electric machines having more than two poles.

Figure 7:
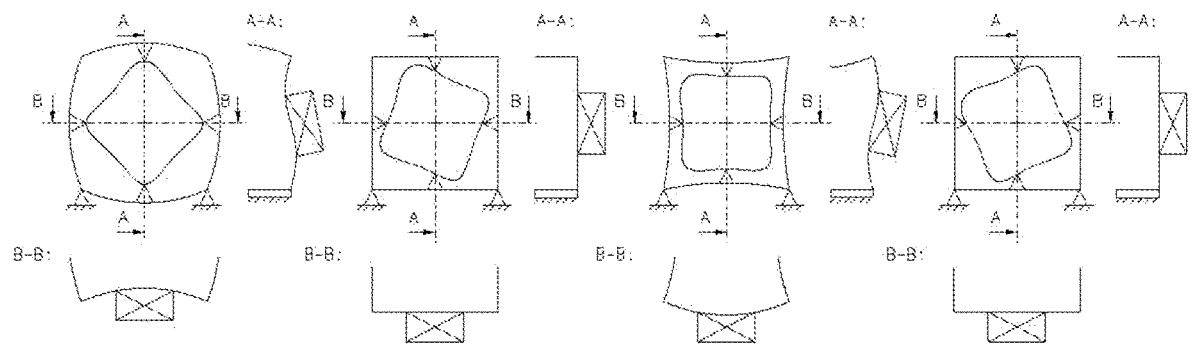
FIG. 7 shows stator deformation in a prior art support arrangement.

FIG. 7 shows stator deformation in a prior art support arrangement.

The figure shows a series of four figures from the left to the right. The inner square denotes the stator and the outer square denotes the frame in each figure. The A-A cross-section shows the vibration mode of the frame end shield at the bearing in the vertical centre plane. The B-B cross-section shows the vibration mode of the frame end shield at the bearing in the horizontal centre plane. The series of four figures show how the rotating deformation advances 22.5 degrees per figure.

The figure shows the situation for an electric machine comprising four poles and a prior art support arrangement. The prior art support arrangement comprises four support necks P1, P2, P3, P4 at each axial Z1-Z1 support location S1, S2. Two first support necks P1, P2 are positioned opposite to each other on the vertical centre plane Y1-Y1 and two second support necks P3, P4 are positioned opposite to each other on the horizontal centre plane X1-X1.

The first figure and the third figure from the left in the row of the figures show that the deformations cause a vibration mode in the horizontal centre plane B-B of the bearing that coincides with the natural vibration mode of the frame end shield at the bearing. This is thus a problematic vibration mode in the prior art support arrangement.

Figure 8:
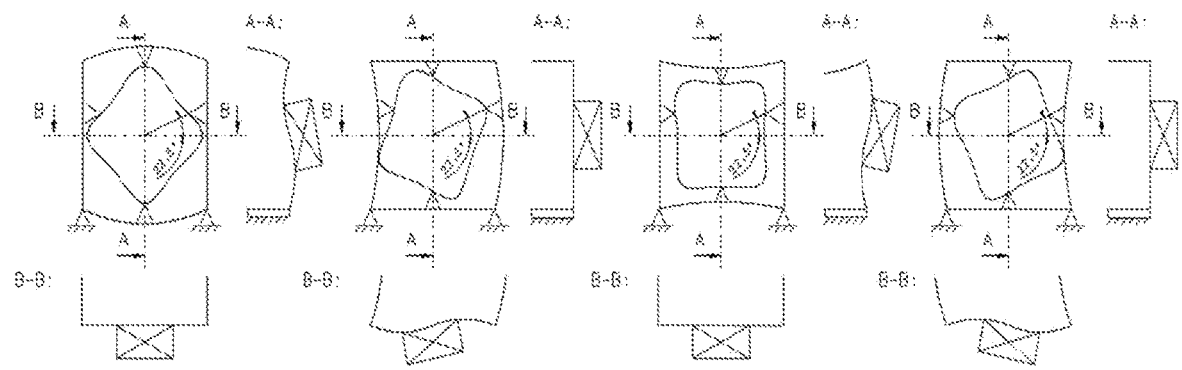
FIG. 8 shows stator deformation in the support arrangement according to the invention.

FIG. 8 shows stator deformation in the support arrangement according to the invention.

The figure shows a series of four figures from the left to the right. The inner square denotes the stator and the outer square denotes the frame in each figure. The A-A cross-section shows the vibration mode of the frame end shield at the bearing in the vertical centre plane. The B-B cross-section shows the vibration mode of the frame and shield at the bearing in the horizontal centre plane. The series of four figures show how the rotating deformation advances 22.5 degrees per figure.

The figure shows the situation for an electric machine comprising four poles and a support arrangement according to the invention. The support arrangement comprises four support necks P1, P2, P3, P4 at each axial Z1-Z1 support location S1, S2. Two first support necks P1, P2 are positioned opposite to each other on the vertical centre plane Y1-Y1 and two second support necks P3, P4 are positioned opposite to each other at an angle $\alpha1=(90/P)$ above the horizontal centre plane X1-X1.

The second figure and the fourth figure from the left in the row of the figures show that the deformations cause a vibration mode in the horizontal centre plane B-B of the frame end shield at the bearing having an S-shape. The S-shape is not a problematic vibration mode and does not coincide with the natural vibration mode of the frame end shield at the bearing. The problematic vibration mode occurring in the prior art support arrangement have thus been eliminated in the support arrangement according to the invention.

The figures show an embodiment in which the stator 200 is attached to the frame 300 at two axial Z1-Z1 support location S1, S2. The two support locations S1, S2 are located at the respective axial Z1-Z1 end portions of the stator 200. The stator 200 in a big electric machine having a long stator 200 may be attached to the frame 300 at additional support locations positioned between the first support location S1 and the second support location S2. The support arrangement between the stator 200 and the frame 300 in the additional support locations may in an advantageous embodiment be the same as in the axially outermost support locations S1, S2. The support arrangement could, however, also be different in the additional support locations positioned between the axially Z1-Z1 outermost support locations S1, S2. Any prior art support arrangement between the stator 200 and the frame 300 could be used in the additional support locations positioned between the axially Z1-Z1 outermost support locations S1, S2. It is advantageous to apply the support arrangement according to the invention at least to the axially outermost support locations S1, S2. This is because the axially Z1-Z1 outermost support locations S1, S2 are closer to the frame end shields 320, 330 and the bearings 20, 30 compared to an additional support location positioned between the axially Z1-Z1 outermost support locations S1, S2.

The figures show an embodiment in which the electric machine comprises a first group of support necks P1, P2 comprising two support necks P1, P2 and a second group of support necks P3, P4 comprising two support necks P3, P4 at each axial Z1-Z1 support location S1, S2. The two support necks P1, P2 in the first group of support necks are positioned opposite to each other on the vertical centre plane Y1-Y1 and the two support necks P3, P4 in the second group of support necks are positioned opposite to each other at an angle α1=(90/P) above the horizontal centre plane X1-X1. This is an advantageous embodiment of the invention.

The two support necks P3, P4 in the second group of support necks could, however, also be positioned opposite to each other at an angle α1=(90/P) below the horizontal centre plane X1-X1. At least some of the advantages achieved by having the two support necks P3, P4 in the second group of support necks positioned opposite to each other at an angle α1=(90/P) above the horizontal centre plane X1-X1 may also be achieved by having the two support necks P3, P4 in the second group of support necks positioned opposite to each other at an angle α1=(90/P) below the horizontal centre plane X1-X1.

The two support necks P3, P4 in the second group of support necks may be positioned on a common horizontal plane. The common horizontal plane may be parallel with the horizontal centre plane X1-X1.

The first angle α1 is α1=(90/P)=22.5 degrees when the pole number P is four. This seems according to present knowledge to be an optimal solution for a four-pole electric machine. At least some advantages may, however, also be achieved with a first angle α1 being slightly different from α1=(90/P). The first angle α1 could thus be α1=(90/P)±(⅕)*(90/P). The deviation from the optimum value 22.5 degrees for a four-pole electric machine would thus be ±4.5 degrees. The first angle α1 could thus be substantially α1=(90/P).

The depth A1 and the width W1 of the protrusions 261A, 261B, 261C, 261D in the stator end plate 260 in an electric machine in which the outer diameter D1 of the stator 200 is 1000 mm may be A1=1.0 to 2.0 mm, W1=80 mm. The angular width of the side protrusions 261A, 261B, 261C, 261D in the stator end plate 260 may be in the order of 4 to 20 degrees, preferably in the range of 5 to 10 degrees. The axial thickness of the intermediate frame plate 340, 350 may be in the order of 30 mm. The values relating to the width W1 and to the angular width given above apply especially to the two side protrusions 261C, 261D forming the side necks P4, P4 in the support arrangement.

The axial length of the protrusions 261A, 261B, 261C, 261D could be greater than the axial thickness of the stator end plate 260. The axial length of the protrusions 261A, 261B, 261C, 261D could be 1 to 6 times the axial thickness of the stator end plate 260.

The support necks P1, P2, P3, P4 may be inherently flexible in the radial direction. A particularly preferred solution is to have a radially flexible support to a frame 300 that is as rigid as possible in the radial direction.

The frame 300 of the electric machine may be symmetric in relation to the vertical centre plane Y1-Y1 of the stator 200. The frame 300 of the electric machine may on the other hand be asymmetric in relation to the horizontal centre plane X1-X1 of the stator 200.

The support necks P1, P2, P3, P4 at each axial Z1-Z1 support location S1, S2 may form the only contact points between the stator 200 and the frame 300.

The axial Z1-Z1 middle points of all support necks P1, P2, P3, P4 in each axial Z1-Z1 support location S1, S2 may be positioned on a common plane. Said common plane may be perpendicular to the axial centre line Z1-Z1 of the stator 200.

The support necks P1, P2, P3, P4 have a certain area i.e. they extend a certain amount in the angular direction and a certain amount in the axial direction. The support between the stator 200 and the frame 300 is thus not formed through a single support point in the support necks P1, P2, P3, P4, but through a certain support area. The first angle α1 is thus measured from the vertical centre plane X1-X1 to the angular middle point of the support necks P3, P4 in the second group of support necks. The support necks P1, P2, P3, P4 extend between the stator 200 and the frame 300 i.e. between an outer surface 201 of the stator 200 and an edge of the opening O2 in the intermediate frame plate 340, 350.

It will be obvious to a person skilled in the art that, as the technology advances, the inventive concept can be implemented in various ways. The invention and its embodiments are not limited to the examples described above but may vary within the scope of the claims.

The invention claimed is:

1. An electric machine comprising a cylindrical stator and a frame surrounding the stator, the stator including an axial centre line, a vertical centre plane (Y1-Y1) passing through the axial centre line, and dividing the stator into a left half and a right half, and a horizontal centre plane passing through the axial centre line and dividing the stator into an upper half and a lower half, the stator being supported on the frame with support necks in at least two axially spaced support locations, a first support location being positioned at a first end portion of the stator and a second support location being positioned at a second end portion of the stator, the support necks in the first support location and in the second support location including a first group of support necks and a second group of support necks, the first group of the support necks including at least one upper support neck positioned in the upper half of the stator in a first sector extending 35 degrees on opposite sides of the vertical centre plane and at least one lower support neck positioned in the lower half of the stator in a second sector extending 35 degrees on opposite sides of the vertical centre plane, wherein:
the second group of support necks comprises a first side support neck and a second side support neck being positioned opposite to each other in relation to the vertical centre plane, the first side support neck being positioned in the left half of the stator at a first angular distance above or below the horizontal centre plane, the second side support neck being positioned in the right half of the stator at a second angular distance above or below the horizontal centre plane, the first angular distance and the second angular distance being equal and defined by a first angle, which is in degrees within the range α1=1.2*90/P and α1=0.8*90/P, where P is the number of poles of the electric machine and P>2.

2. The electric machine according to claim 1, wherein the two side support necks in the second group of support necks positioned at the first support location and the two side support necks in the second group of support necks positioned at the second support location are positioned on the same side of the horizontal centre plane, that is below or above the horizontal centre plane.

3. The electric machine according to claim 2, wherein the stator comprises a stator end plate at each axial end of the stator.

4. The electric machine according to claim 2, wherein the frame comprises an intermediate frame plate at each axial end of the stator.

5. The electric machine according to claim 2, wherein the stator comprises back beams extending in an axial direction on the outer surface of the stator between the axial ends of the stator, the back beams being attached to the stator.

6. The electric machine according to claim 1, wherein the two side support necks in the second group of support necks positioned at the first support location and the two side support necks in the second group of support necks positioned at the second support location are positioned on opposite sides of the horizontal centre plane, that is the two side support necks in the second group of support necks positioned at the first support location (S1) are positioned above the horizontal centre plane and the two side support necks in the second group of support necks positioned at the second support location are positioned below the horizontal centre plane, or vice a versa.

7. The electric machine according to claim 1, wherein the stator comprises a stator end plate at each axial end of the stator.

8. The electric machine according to claim 7, wherein the stator end plate is provided with radially outwards extending protrusions being fitted in an opening in the intermediate frame plate or the intermediate frame plate is provided with radially inwards extending protrusions being fitted on the outer surface of the stator end plate, the protrusions forming the support necks between the stator and the frame.

9. The electric machine according to claim 1, wherein the frame comprises an intermediate frame plate at each axial end of the stator.

10. The electric machine according to claim 9, wherein the stator end plate is provided with radially outwards extending protrusions being fitted in an opening in the intermediate frame plate or the intermediate frame plate is provided with radially inwards extending protrusions being fitted on the outer surface of the stator end plate, the protrusions forming the support necks between the stator and the frame.

11. The electric machine according to claim 1, wherein the stator comprises back beams extending in an axial direction on the outer surface of the stator between the axial ends of the stator, the back beams being attached to the stator.

12. The electric machine according to claim 11, wherein the frame comprises an intermediate frame plate at each axial end portion of the stator.

13. The electric machine according to claim 12, wherein the stator is attached from at least some of the back beams to the intermediate frame plates, the back beams forming the support necks between the stator and the frame.

14. The electric machine according to claim 1, wherein the first group of support necks comprises two support necks.

15. The electric machine according to claim 14, wherein the two support necks in the first group of support necks are positioned opposite to each other substantially on the vertical centre plane.

16. The electric machine according to claim 1, wherein the stator is supported with support necks on the frame in at least one additional support location positioned between the first support location and the second support location.

17. The electric machine according to claim 16, wherein the arrangement of the support necks in the at least one additional support location corresponds to the arrangement of the support necks in the first support location and/or in the second support location.

18. The electric machine according to claim 1, wherein the support necks form the only contacts between the stator and the frame.

19. The electric machine according to claim 1, wherein the frame comprises a longitudinal frame structure with two axial ends, each axial end of the longitudinal frame structure including a frame end shield, at least two intermediate frame plates being positioned within the longitudinal frame structure between the frame end shields.

* * * * *